(12) United States Patent
Kim

(10) Patent No.: US 9,755,215 B2
(45) Date of Patent: Sep. 5, 2017

(54) SECONDARY BATTERY

(71) Applicant: Samsung SDI Co., Ltd., Yongin-si, Gyeonggi-do (KR)

(72) Inventor: Dukjung Kim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 240 days.

(21) Appl. No.: 14/662,154

(22) Filed: Mar. 18, 2015

(65) Prior Publication Data

US 2015/0364742 A1 Dec. 17, 2015

(30) Foreign Application Priority Data

Jun. 17, 2014 (KR) .................. 10-2014-0073645

(51) Int. Cl.
| | | |
|---|---|---|
| H01M 2/00 | (2006.01) | |
| H01M 2/02 | (2006.01) | |
| H01M 2/12 | (2006.01) | |
| H01M 2/30 | (2006.01) | |
| H01M 10/04 | (2006.01) | |

(52) U.S. Cl.
CPC .......... *H01M 2/30* (2013.01); *H01M 2/1205* (2013.01); *H01M 10/04* (2013.01)

(58) Field of Classification Search
CPC ....... H01M 2/021; H01M 2/12; H01M 2/0217
See application file for complete search history.

(56) References Cited

U.S. PATENT DOCUMENTS

| | | | |
|---|---|---|---|
| 2009/0130554 A1* | 5/2009 | Jang | .................... H01M 2/0215 429/179 |
| 2011/0081572 A1* | 4/2011 | Byun | ..................... H01M 2/26 429/178 |
| 2011/0123855 A1 | 5/2011 | Kim et al. | |
| 2011/0244312 A1 | 10/2011 | Tani et al. | |
| 2012/0040218 A1 | 2/2012 | Zheng | |
| 2013/0164581 A2 | 6/2013 | Zheng | |
| 2013/0288101 A1 | 10/2013 | Kim et al. | |
| 2014/0045008 A1 | 2/2014 | Yan et al. | |
| 2015/0125738 A1 | 5/2015 | Hirose | |

FOREIGN PATENT DOCUMENTS

| | | |
|---|---|---|
| JP | 2001-325945 | 11/2001 |
| KR | 10-2011-0057674 A | 6/2011 |
| KR | 10-2012-0024685 A | 3/2012 |
| KR | 10-2013-0121517 A | 11/2013 |
| WO | WO 2013/164998 A1 | 11/2013 |

OTHER PUBLICATIONS

EPO Search Report dated Jul. 29, 2015, for corresponding European Patent application 15166547.8, (5 pages).
English Abstract, and English machine translation of Japanese Publication 2001-325945 dated Nov. 22, 2001, listed above, (31 pages).

* cited by examiner

*Primary Examiner* — Patrick Ryan
*Assistant Examiner* — Julian Anthony
(74) *Attorney, Agent, or Firm* — Lewis Roca Rothgerber Christie LLP

(57) ABSTRACT

A secondary battery includes an electrode assembly; a case accommodating the electrode assembly; a cap plate sealing the case; and a first electrode terminal electrically connected to the electrode assembly and passing through the cap plate, wherein the electrode assembly is connected to the first electrode terminal through a first current collection tab.

17 Claims, 11 Drawing Sheets

SECONDARY BATTERY

CROSS-REFERENCE TO RELATED APPLICATION

This application claims priority to and the benefit of Korean Patent Application No. 10-2014-0073645 filed on Jun. 17, 2014, the contents of which are incorporated herein by reference in their entirety.

BACKGROUND

1. Field

Embodiments of the present invention relate to a secondary battery.

2. Description of the Related Art

In general, secondary batteries are rechargeable batteries, unlike primary batteries. A small-capacity secondary battery including a single battery cell packaged in the form of a pack is used in a small-sized portable electronic device such as a cellular phone or camcorder, and a large-capacity secondary battery including dozens of battery cells connected to one another is widely used as a power source for driving a hybrid vehicle or a large-capacity power storage device.

Secondary batteries are manufactured in various shapes such as a cylindrical shape and a prismatic shape. A secondary battery is typically constructed as follows: an electrode assembly formed by locating a separator between a positive electrode plate and a negative electrode plate is placed in a case together with electrolyte, and a cap plate is on the case.

The electrode assembly is generally connected to electrode terminals through current collectors. In this case, however, a current path between the electrode assembly and each of the electrode terminals may be lengthened, increasing electrical resistance.

SUMMARY

Embodiments of the present invention provide a secondary battery which can reduce electrical resistance and can save cost by directly connecting an electrode uncoated portion of an electrode assembly to an electrode terminal.

According to aspects of the present invention, there is provided a secondary battery including an electrode assembly, a case accommodating the electrode assembly, a cap plate sealing the case, and a first electrode terminal electrically connected to the electrode assembly and passing through the cap plate, wherein the electrode assembly is connected to the first electrode terminal through a first current collection tab.

The electrode assembly may include a first electrode plate having a first electrode uncoated portion, a second electrode plate having a second electrode uncoated portion, and a separator interposed between the first electrode plate and the second electrode plate, and the first current collection tab may be the first electrode uncoated portion itself.

The electrode assembly may include a first electrode plate having a first electrode uncoated portion, a second electrode plate having a second electrode uncoated portion, and a separator interposed between the first electrode plate and the second electrode plate, and the first current collection tab may be coupled to the first electrode uncoated portion.

The first current collection tab may protrude to an upper portion of the electrode assembly, one side of the first current collection tab may be connected to the first electrode terminal and the other side of the first current collection tab may be bent to a lower portion of the first electrode terminal.

Each of a plurality of electrode assemblies may be connected to the first electrode terminal.

The first current collection tabs connected to the plurality of electrode assemblies may be symmetrically formed to face each other.

A guide plate may be coupled to the first current collection tab.

The secondary battery may further include a second electrode terminal electrically connected to the second electrode plate. In one embodiment, the electrode assembly may be connected to the second electrode terminal through a second current collection tab.

The secondary battery may further include an insulation support member positioned between each of the first and second electrode terminals and the cap plate and coupling the first and second electrode terminals to the cap plate.

The insulation support member may include an insulation part coupled to the first electrode terminal and the second electrode terminal, positioned under the cap plate and insulating the first and second electrode terminals from the cap plate, a support part coupled to a lower portion of the insulation part and supporting the electrode assembly, and a connection part connecting the insulation part and the support part to each other.

The insulation part may include a terminal hole including a first terminal hole coupled to the first electrode terminal and a second terminal hole coupled to the second electrode terminal, a throughhole positioned between the first terminal hole and the second terminal hole, and a coupling hole positioned at the exterior side of the terminal hole.

The throughhole may be formed at a location corresponding to a safety vent and an electrolyte injection hole formed in the cap plate.

The support part may include a planar part extending from the insulation part and formed to be planar, and leg parts formed at opposite edges of the planar part.

Each of the leg parts may include an elastic part extending from the planar part and formed convexly toward the electrode assembly and a coupling member extending from the elastic part and formed to be planar.

The coupling member may have a coupling protrusion formed therein and the coupling protrusion may be coupled to the coupling hole.

The planar part may not cover the throughhole and the leg parts may not cover the terminal hole.

A leg part may further be formed at the center of the planar part and a hole corresponding to the throughhole may be formed in the elastic part of the leg part.

The leg part may extend to cover the terminal hole and a coupling member of the leg part may be stepped.

The first electrode terminal may include a first terminal body passing through the cap plate and a first terminal extension part horizontally extending from a lower portion of the first terminal body, the second electrode terminal may include a second terminal body passing through the cap plate and a second terminal extension part horizontally extending from a lower portion of the second terminal body, the first current collection tab may be welded to the first terminal extension part, and the second current collection tab may be welded to the second terminal extension part.

In the secondary battery according to the embodiments of the present invention, an electrode uncoated portion is directly welded to an electrode terminal, thereby shortening a current path and reducing electrical resistance.

In addition, unlike in the conventional secondary battery, in the secondary battery according to the embodiment of the present invention, a current collector connecting the electrode uncoated portion and the electrode terminal is not required, thereby reducing the cost.

Additional aspects of the invention will be set forth in part in the description which follows.

BRIEF DESCRIPTION OF THE DRAWINGS

The aspects, features and advantages of the present invention will be more apparent from the following detailed description in conjunction with the accompanying drawings, in which.

DETAILED DESCRIPTION

Hereinafter, examples of embodiments of the invention will be described in detail with reference to the accompanying drawings such that they can easily be made and used by those skilled in the art.

Figure 1:
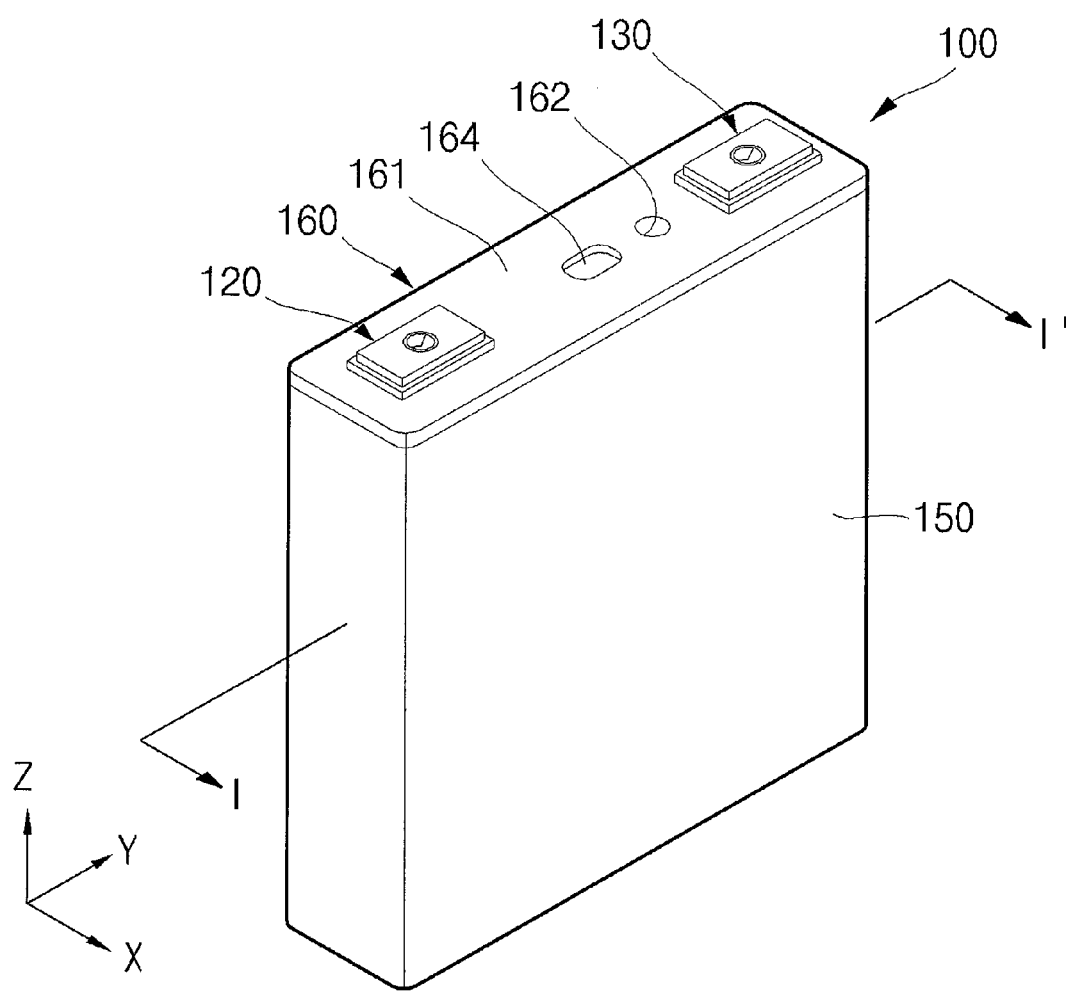
FIG. 1 is a perspective view of a secondary battery according to an embodiment of the present invention.
Figure 2:
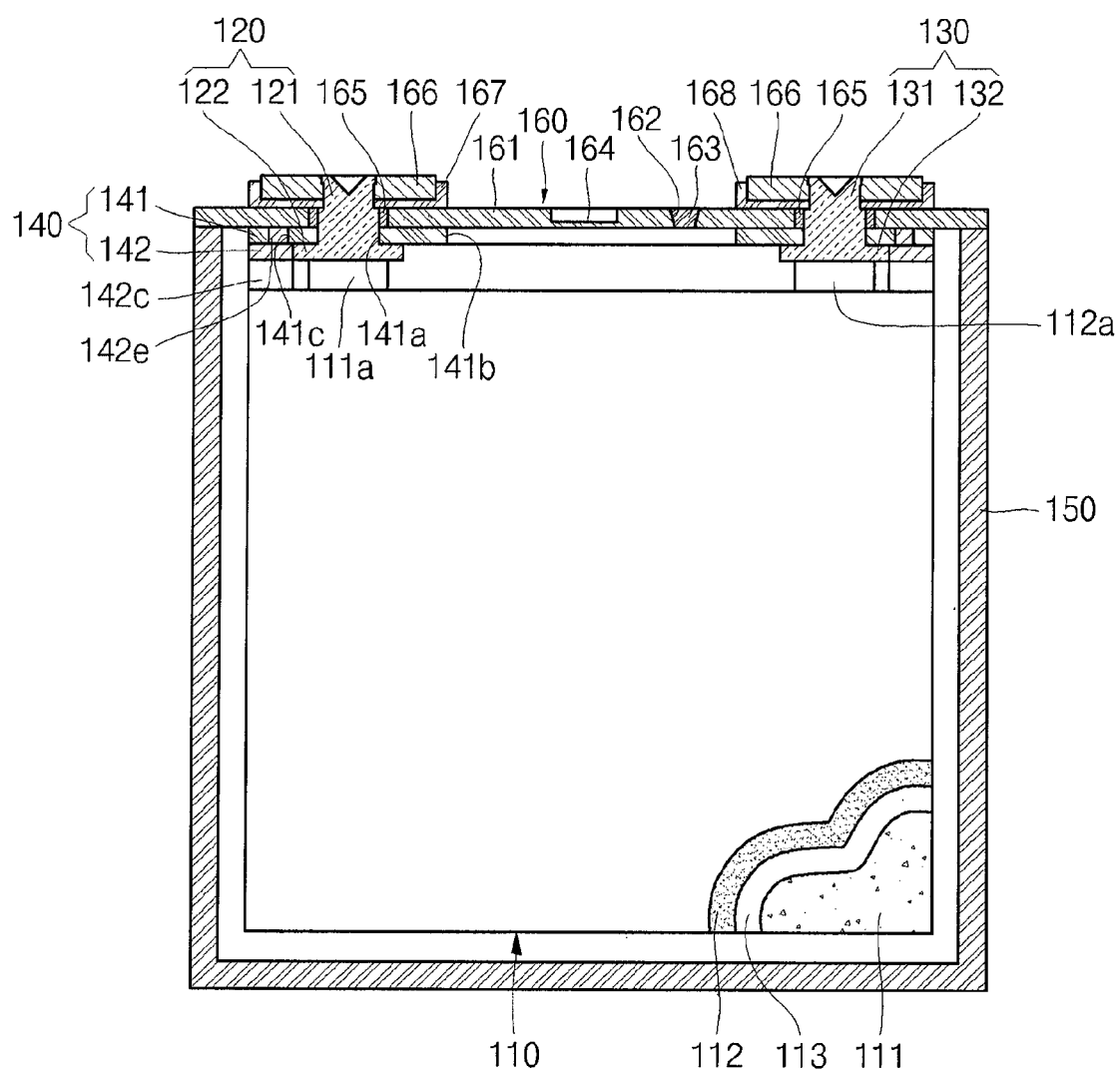
FIG. 2 is a cross-sectional view of the secondary battery shown in FIG. 1, taken along the line I-I'.
Figure 3A:
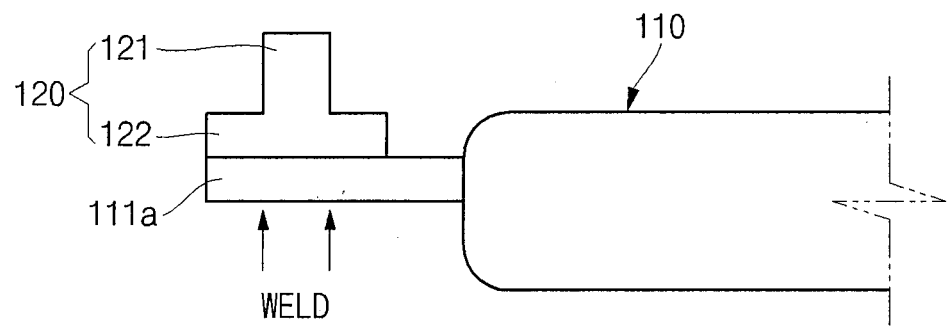
FIGS. 3A to 3D are side views illustrating a connection relationship between an electrode assembly and a first electrode terminal shown in FIG. 1.
Figure 3B:
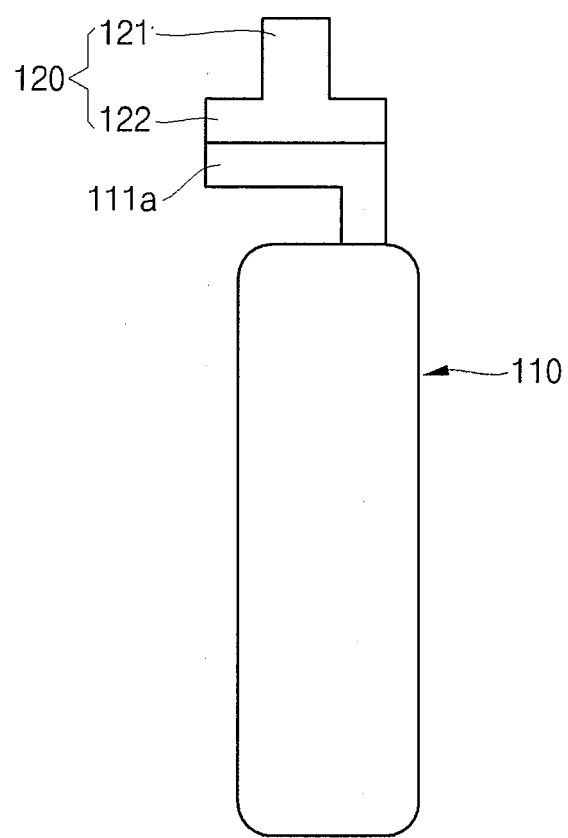
Figure 3C:
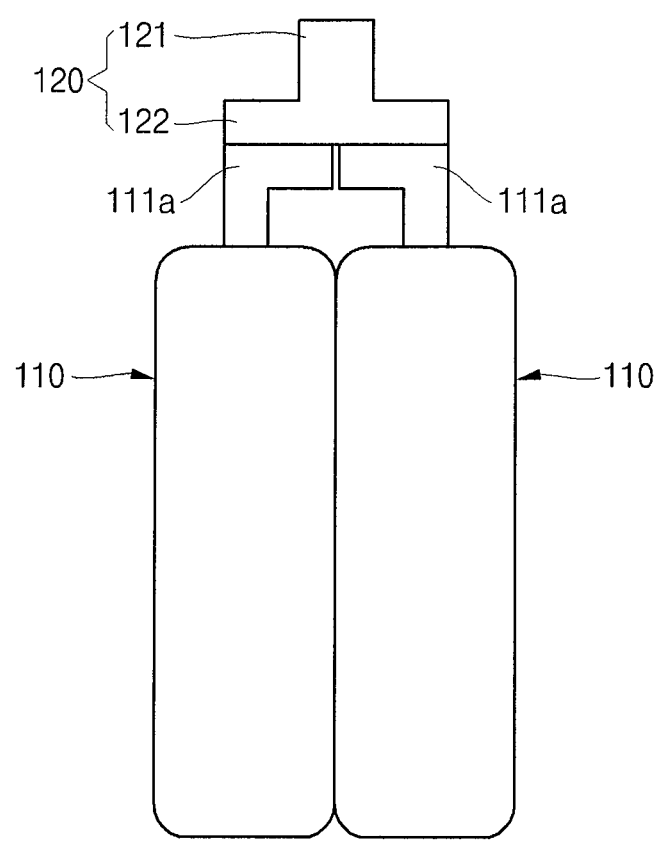
Figure 3D:
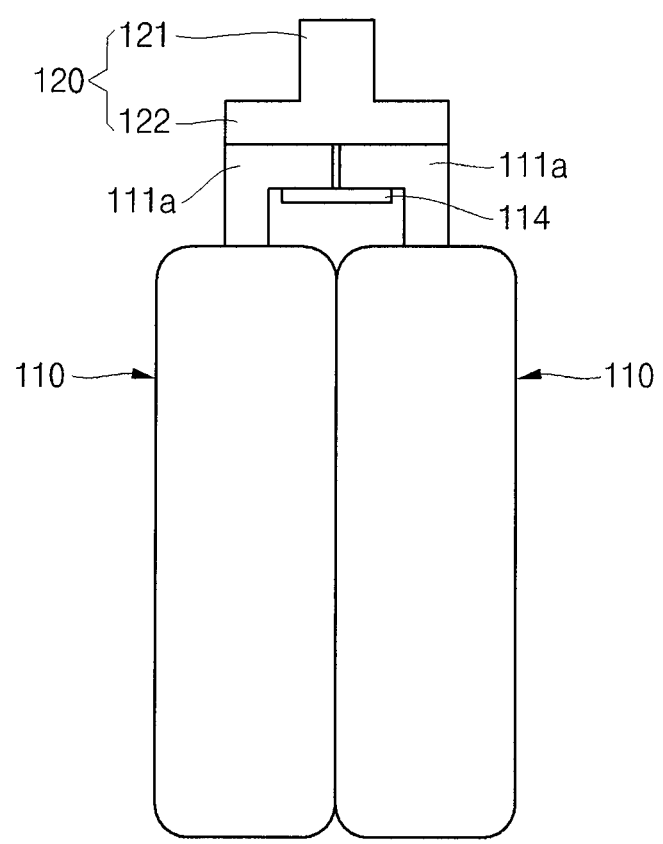
Figure 4:
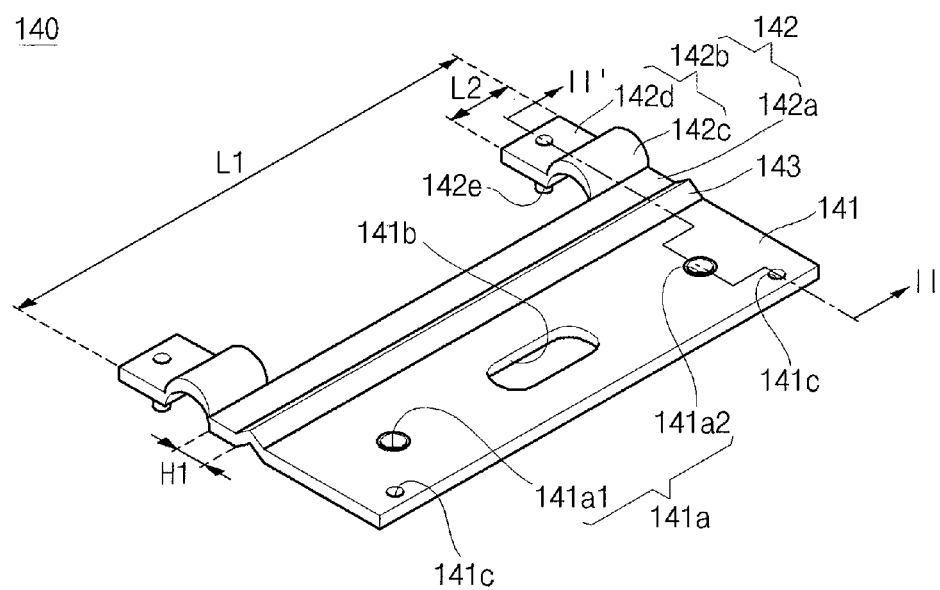
FIG. 4 is a perspective view of an insulation support member shown in FIG. 2.
Figure 5:
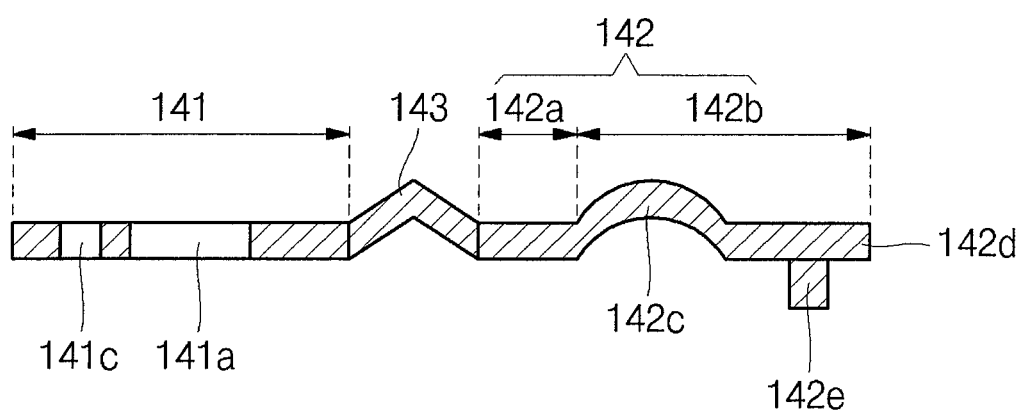
FIG. 5 is a cross-sectional view, taken along the line II-II' shown in FIG. 4.
Figure 6A:
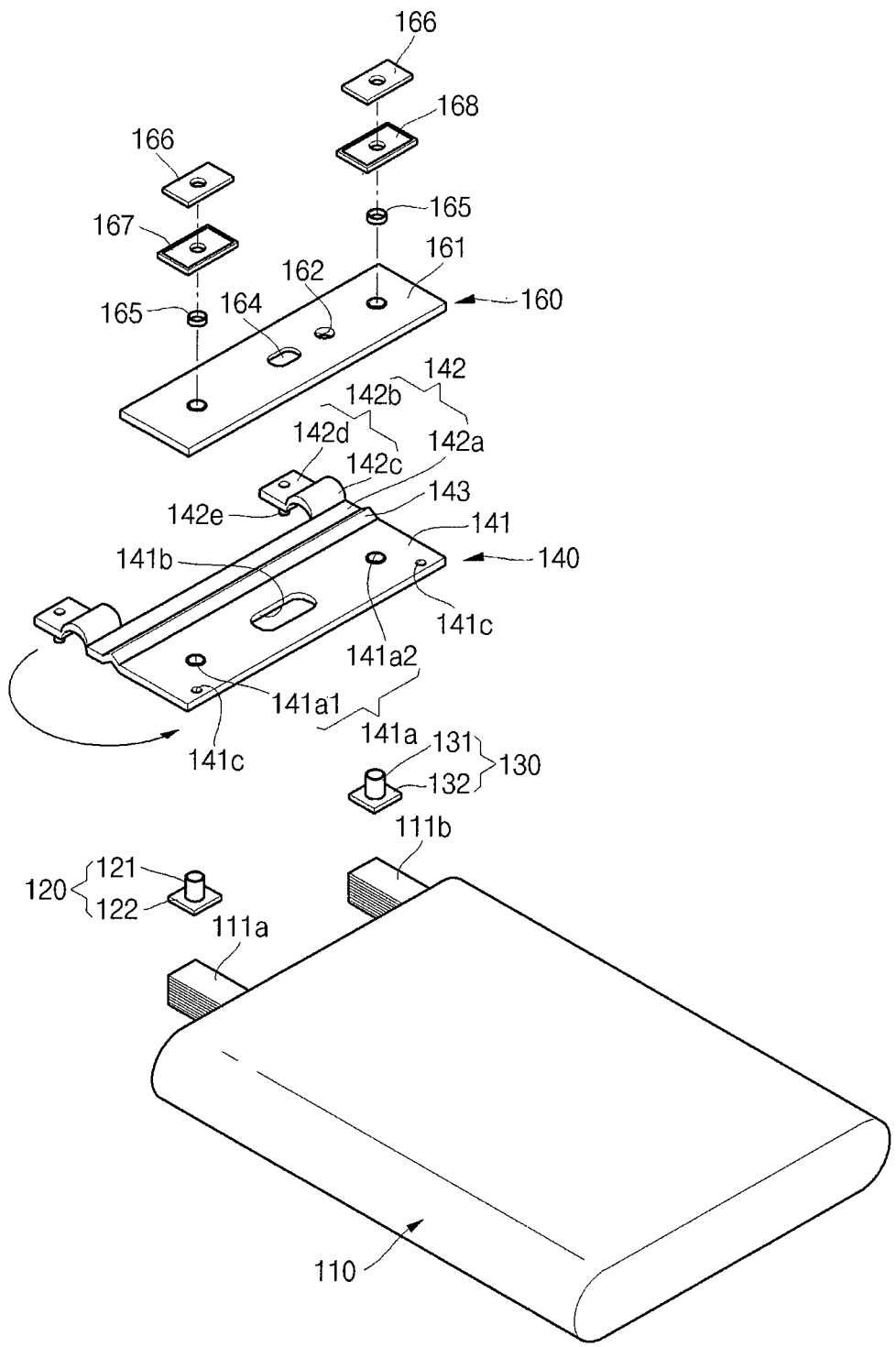
FIGS. 6A and 6B are partially exploded perspective views of the secondary battery shown in FIG. 1.
Figure 6B:
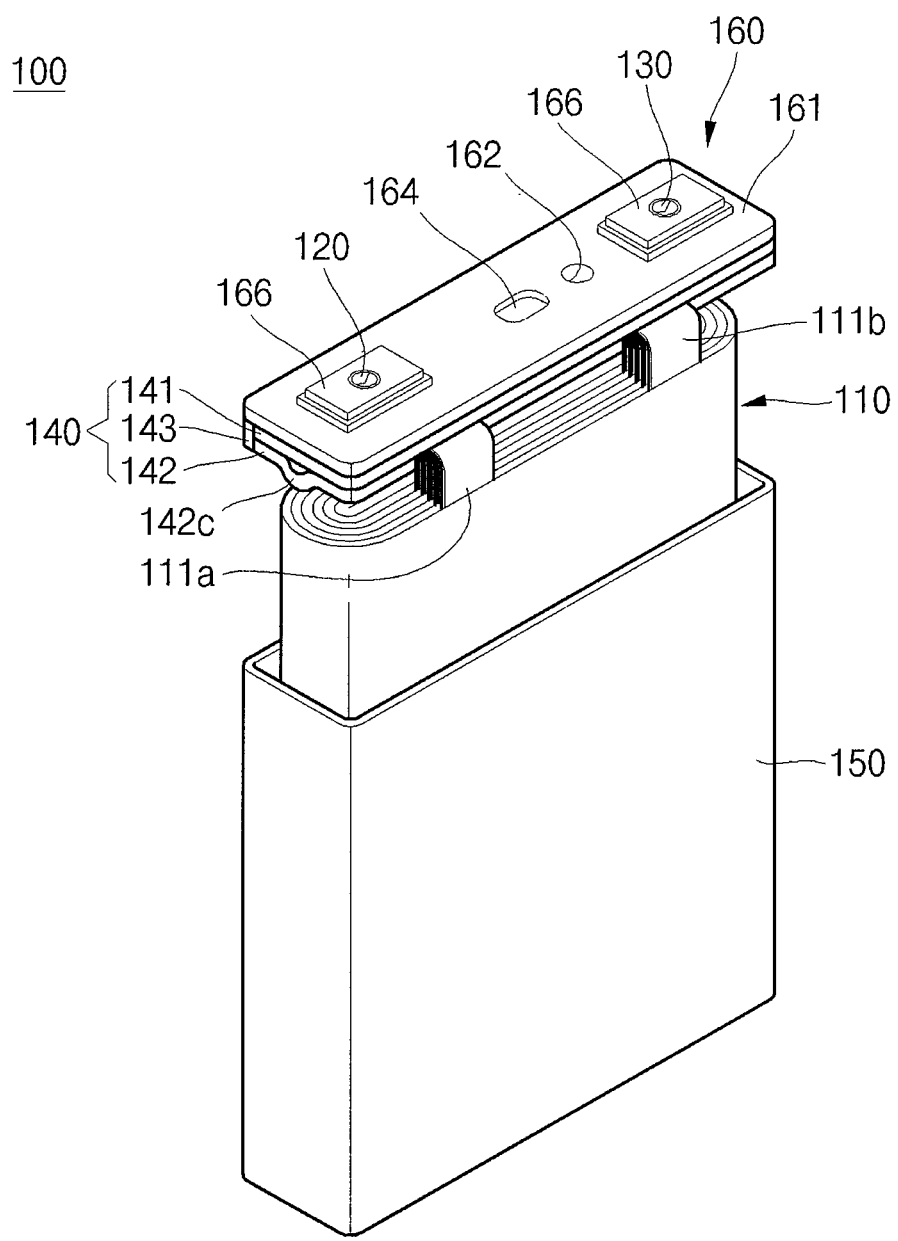

FIG. 1 is a perspective view of a secondary battery according to an embodiment of the present invention, FIG. 2 is a cross-sectional view of the secondary battery shown in FIG. 1, taken along the line I-I', FIGS. 3A to 3D are side views illustrating a connection relationship between an electrode assembly and a first electrode terminal shown in FIG. 1, FIG. 4 is a perspective view of an insulation support member shown in FIG. 2, FIG. 5 is a cross-sectional view, taken along the line II-II' shown in FIG. 4, and FIGS. 6A and 6B are partially exploded perspective views of the secondary battery shown in FIG. 1.

Referring to FIGS. 1 to 6B, the secondary battery 100 according to an embodiment of the present invention includes an electrode assembly 110, a first electrode terminal 120, a second electrode terminal 130, an insulation support member 140, a case 150 and a cap assembly 160.

The electrode assembly 110 may be formed by winding or stacking a first electrode plate 111, a first separator 113, and a second electrode plate 112, which may have a thin plate or film shape.

The first electrode plate 111 may be formed by applying a first electrode active material, such as a transition metal oxide, to a first electrode collector formed of metal foil, such as aluminum. The first electrode plate 111 may include a first electrode uncoated portion 111a to which the first electrode active metal is not applied. The first electrode uncoated portion may function as a current flow passage between the first electrode plate 111 and the outside of the first electrode plate 111.

In some cases, the first electrode uncoated portion 111a may serve as and be called a first current collection tab. The first electrode uncoated portion 111a is formed at one side of the electrode assembly 110 and protrudes to an upper portion of the electrode assembly 110. In one embodiment, since the first electrode uncoated portion 111a is formed by being previously cut to upwardly protrude when the first electrode plate 111 is formed, it is integrally formed with the first electrode plate 111. In addition, since the first electrode uncoated portion 111a is formed by winding or laminating the first electrode plate 111, a plurality of first electrode uncoated portions 111a may be stacked (Refer to FIG. 6A.). In other words, the first current collection tab may be the first electrode uncoated portion 111a itself.

In addition, the first current collection tab may be formed by separately being coupled to the first electrode uncoated portion 111a. In one embodiment, the first electrode uncoated portion 111a may be formed by attaching a separate first current collection tab to the first electrode uncoated portion 111a to allow the first current collection tab to protrude to an upper portion of the electrode assembly 110, rather than being previously cut to upwardly protrude when the first electrode plate 111 is formed.

The second electrode plate 112 may be formed by applying a second electrode active material, such as graphite or carbon, to a second electrode collector formed of metal foil such as copper or nickel foil. The second electrode plate 112 may include a second electrode uncoated portion 112a to which the second electrode active metal is not applied.

In some cases, the second electrode uncoated portion 112a may serve as and also be called a second current collection tab. The second electrode uncoated portion 112a is formed at the other side of the electrode assembly 110 and protrudes to an upper portion of the electrode assembly 110. In one embodiment, since the second electrode uncoated portion 112a is formed by the same method with the first electrode uncoated portion 111a being previously cut to upwardly protrude when the second electrode plate 111 is formed, it is integrally formed with the second electrode plate 111. In addition, since the second electrode uncoated portion 112a is formed winding or laminating the second electrode plate 111, a plurality of second electrode uncoated portions 112a may be stacked (see FIG. 6A.). In other words, the second current collection tab may be the second electrode uncoated portion 112a itself.

In addition, the second current collection tab may be formed by separately being coupled to the second electrode uncoated portion 112a. In one embodiment, the second electrode uncoated portion 112a may be formed by attaching a separate second current collection tab to the second electrode uncoated portion 112a to allow the second current collection tab to protrude to an upper portion of the electrode assembly 110, rather than being previously cut to upwardly protrude when the second electrode plate 112 is formed.

The first separator 113 is located between the first electrode plate 111 and the second electrode plate 112. The first separator 113 prevents a short circuit and allows movement of lithium ions. The first separator 113 may be formed of a polyethylene film or a film including polyethylene and polypropylene.

In addition, the electrode assembly 110 may be accommodated in the case 150 together with an electrolyte. The electrolyte may include an organic solvent such as ethylene carbonate (EC), propylene carbonate (PC), diethyl carbonate (DEC), ethyl methyl carbonate (EMC), and dimethyl carbonate (DMC); and a lithium salt such as $LiPF_6$ or $LiBF_4$. The electrolyte may be a liquid, solid, or gel.

The first electrode terminal 120 is formed of a conductive material, such as aluminum, and is coupled to the first electrode uncoated portion 111a protruding to an upper portion of the electrode assembly 110 to then be electrically connected to the first electrode plate 111. In one embodiment, the first electrode terminal 120 is directly welded to the first electrode uncoated portion 111a to then be electrically connected to the first electrode plate 111. The first electrode terminal 120 includes a first terminal body 121 and a first terminal extension part 122.

The first terminal body 121 passes through the cap plate 161 of the cap assembly 160 and has an upper portion riveted to be fixed to the cap plate 161.

The first terminal extension part 122 horizontally extends from a lower portion of the first terminal body 121 and is positioned under the cap plate 161. The first electrode uncoated portion 111a is coupled to the first terminal extension part 122. In detail, as shown in FIG. 3A, the first electrode uncoated portion 111a is welded to a bottom surface of the first terminal extension part 122, so that the first electrode terminal 120 and the first electrode plate 111 are electrically connected. Then, as shown in FIG. 3B, the first electrode uncoated portion 111a is bent and the electrode assembly 110 is positioned under the first electrode terminal 120. In other words, one side of the first electrode uncoated portion 111a is welded to the first electrode terminal 120 and the other side of the first electrode uncoated portion 111a is bent to a lower portion of the first electrode terminal 120.

As described above, the electrode assembly 110 is bent to then be accommodated in the case 150 after the first electrode uncoated portion 111a is welded to the first terminal extension part 122. In addition, as shown in FIG. 3C, the plurality of electrode assemblies 110 may be connected to the first electrode terminal 120. In other words, the first electrode uncoated portion 111a may be welded to the first terminal extension part 122 of each of the plurality of electrode assemblies 110 and the electrode assemblies 110 may be positioned to face each other. In one embodiment, the first electrode uncoated portions 111a are symmetrically formed. In addition, as shown in FIG. 3D, a guide plate 114 may be coupled to the first electrode uncoated portion 111a. The guide plate 114 connects the first electrode uncoated portions 111a adjacent with each other and are coupled to the first electrode uncoated portions 111a by welding. The guide plate 114 prevents the first electrode uncoated portion 111a from being damaged and connects the first electrode uncoated portion 111a to the first electrode terminal 120.

After the first electrode uncoated portion 111a is welded to the first terminal extension part 122, the first terminal body 121 passes through the insulation support member 140 and the cap plate 161, so that the first electrode terminal 120 is coupled to the cap plate 161. In addition, a terminal plate 166 is coupled to the first terminal body 121 passing through the cap plate 161 and upwardly protruding, and an upper portion of the first terminal body 121 is riveted, so that the first electrode terminal 120 may be fixed to the cap plate 161.

As described above, since the first electrode uncoated portion 111a is directly welded to the first electrode terminal 120, a current path is shortened and electrical resistance is reduced accordingly. In addition, unlike in the convention secondary battery, since the secondary battery according to the present invention does not require a current collector connecting the first electrode uncoated portion 111a and the first electrode terminal 120, the cost may be reduced.

The second electrode terminal 130 is formed of a conductive material, such as nickel, and is coupled to the second electrode uncoated portion 112a upwardly protruding to the other side of the electrode assembly 110 to then be electrically connected to the second electrode plate 112. In one embodiment, since the second electrode terminal 130 is directly welded to the second electrode uncoated portion 112a to then be electrically connected to the second electrode plate 112. The second electrode terminal 130 includes a second terminal body 131 and a second terminal extension part 132.

The second terminal body 131 passes through the cap plate 161 of the cap assembly 160 and has an upper portion riveted to be fixed to the cap plate 161.

The second terminal extension part 132 horizontally extends from a lower portion of the second terminal body 131 and is positioned under the cap plate 161. The second electrode uncoated portion 112a is coupled to the second terminal extension part 132. In detail, as shown in FIG. 6A, the second electrode uncoated portion 112a is welded to a bottom surface of the second terminal extension part 132, so that the second electrode terminal 130 and the second electrode plate 112 are electrically connected. In one embodiment, since the second electrode terminal 130 is formed in the same manner with the first electrode terminal 120, connection relationships between each of the second electrode terminal 130, the electrode assembly 110 and the cap plate 161 will not be repeatedly described.

The first electrode terminal 120 and the second electrode terminal 130 are coupled to the insulation support member 140 and the insulation support member 140 is coupled to the cap plate 161. In other words, the insulation support member 140 couples the first electrode terminal 120 and the second electrode terminal 130 to the cap plate 161. In addition, the insulation support member 140 is formed of an insulating material to insulate the first and second electrode terminals 120 and 130 from the cap plate 161 while supporting the electrode assembly 110. The insulation support member 140 may be formed of a resin-based insulating material, such as polypropylene (PP) or polyethylene (PE). The insulation support member 140 includes an insulation part 141, a support part 142 and a connection part 143 (FIG. 4).

The insulation part 141 is positioned between each of the first and second electrode terminals 120 and 130 and the cap plate 161. In addition, the insulation part 141 is formed of an insulating material and insulates the first and second electrode terminals 120 and 130 from the cap plate 161. The insulation part 141 is shaped of a rectangular plate and is sized to be slightly smaller than the cap plate 161. The insulation part 141 includes a terminal hole 141a, a throughhole 141b, and a coupling hole 141c.

The first electrode terminal 120 and the second electrode terminal 130 are coupled to the terminal hole 141a. In detail, the terminal hole 141a includes a first terminal hole 141a1 coupled to the first electrode terminal 120 and a second terminal hole 141a2 coupled to the second electrode terminal 130.

The throughhole 141b is positioned between the first terminal hole 141a1 and the second terminal hole 141a2. The throughhole 141b is formed at a location corresponding to a safety vent 164 and an electrolyte injection hole 162 formed in the cap plate 161. In other words, since the insulation part 141 is coupled to a lower portion of the cap plate 161, the throughhole 141b is located corresponding to the safety vent 164 and the electrolyte injection hole 162 so as not to block the safety vent 164 and the electrolyte injection hole 162 (i.e., the throughhole 141b overlaps with the safety vent 164 and the electrolyte injection hole 162). Therefore, the throughhole 141b allows the safety vent 164 to properly operate and an electrolyte to be injected through the electrolyte injection hole 162.

The coupling hole 141c is formed at an exterior side of the terminal hole 141a. In other words, the coupling hole 141c is positioned at the outermost part of the insulation part 141 or close to an edge of the insulation part 141. A coupling protrusion 142e of a support part 142 to later be described is coupled to the coupling hole 141c. In other words, as the coupling protrusion 142e is coupled to the coupling hole 141c, the insulation part 141 and the support part 142 are engaged with each other.

The support part 142 is coupled to a lower portion of the insulation part 141 and is positioned between each of the first and second electrode terminals 120 and 130 and the electrode assembly 110. The support part 142 includes a planar part 142a and leg parts 142b.

The planar part 142a extends from the insulation part 141 and is shaped of a planar plate. A horizontal length L1 of the planar part 142a is substantially equal to a horizontal length of the insulation part 141. A vertical length H1 of the planar part 142a is substantially equal to or smaller than a length ranging from a long side of the insulation part 141 to the throughhole 141b. In other words, the planar part 142a is formed so as not to cover or block the throughhole 141b.

The leg parts 142b are formed at opposite edges of the planar part 142a. Therefore, an empty space or gap is formed between the leg parts 142b. In addition, a horizontal length L2 of each of the leg parts 142b is substantially equal to or smaller than a length ranging from a short side of the insulation part 141 to the terminal hole 141a. In other words, the leg parts 142b are formed so as not to cover or block the terminal hole 141a. Each of the leg parts 142b includes an elastic part 142c formed convexly toward the electrode assembly 110 and a coupling member 142d extending from the elastic part 142c and formed to be planar. In one embodiment, the elastic part 142c is a leaf spring. The elastic part 142c makes contact with the electrode assembly 110 and supports the electrode assembly 110 so as prevent movement of the electrode assembly 110 within the case 150. In other words, since the elastic part 142c is formed to be convex toward the electrode assembly 110 and is shaped of an elastic leaf spring, the electrode assembly 110 may be supported. Therefore, the elastic part 142c may prevent the electrode assembly 110 from moving within the case 150. However, in one embodiment, the elastic part 142c may not make contact with the electrode assembly 110.

The coupling member 142d is directly coupled to the insulation part 141. The coupling protrusion 142e is formed in the coupling member 142d to be engaged with the coupling hole 141c of the insulation part 141. The coupling protrusion 142e fixes the support part 142 to the insulation part 141. Therefore, the support part 142 is fixed to the lower portion of the insulation part 141 by the coupling protrusion 142e. In addition, the coupling protrusion 142e is not dislodged from the coupling hole 141c by elasticity of the elastic part 142c.

The connection part 143 is positioned between the insulation part 141 and the support part 142. The connection part 143 is folded when the support part 142 is coupled to the insulation part 141. The connection part 143 may be hingedly formed to allow the support part 142 to be easily coupled to or separated to/from the insulation part 141.

The case 150 may be formed of a conductive metal such as aluminum, aluminum alloy, or steel plated with nickel. The case 150 may have an approximately hexahedral shape with an opening so that the electrode assembly 110, the first electrode terminal 120, the second electrode terminal 130 and the insulation support member 140 can be inserted and placed in the case 150. In FIG. 2 illustrating a state in which the case 150 and the cap assembly 160 are coupled to each other, the opening is not shown, but is a substantially opened part of the periphery of the cap assembly 160. In one embodiment, the case 150 may have a polarity. For example, the case 150 may function as a positive electrode.

The cap assembly 160 is coupled to the case 150. In detail, the cap assembly 160 includes the cap plate 161, the electrolyte injection hole 162, a plug 163, the safety vent 164, a gasket 165, the terminal plate 166, the connection member 167 and an upper insulation member 168.

The cap plate 161 may close or seal the opening of the case 150, and may include the same material as that of the case 150. For example, the cap plate 161 may be coupled to the case 150 by laser welding. In one embodiment, the cap plate 161 and the case 150 may have the same polarity.

The electrolyte injection hole 162 is formed in the cap plate 161 and the electrolyte is injected through the electrolyte injection hole 162. In addition, the plug 163 seals the electrolyte injection hole 162.

The safety vent 164 is formed in the cap plate 161 and has a smaller thickness (i.e., is thinner) than the cap plate 161 and is configured to be opened at a predetermined pressure.

The throughhole 141b of the insulation part 141 is positioned under the electrolyte injection hole 162 and the safety vent 164. Therefore, the safety vent 164 properly operates and the electrolyte is injected through the electrolyte injection hole 162 without hindrance.

The gasket 165, formed of an insulating material, is positioned between each of the first electrode terminal 120 and the second electrode terminal 130 and the cap plate 161 and seals the first electrode terminal 120 and the second electrode terminal 130 from the cap plate 161. The gasket 165 may prevent infiltration of external moisture into the secondary battery 100 and may prevent an electrolyte accommodated in the secondary battery 100 from flowing out.

The terminal plate 166 is coupled to each of the first electrode terminal 120 and the second electrode terminal 130. In addition, after the terminal plate 166 is coupled to each of the first electrode terminal 120 and the second electrode terminal 130, upper portions of the first electrode terminal 120 and the second electrode terminal 130 are riveted, thereby fixing the first electrode terminal 120 and the second electrode terminal 130 to the terminal plate 166.

The connection member 167 is positioned between the terminal plate 166 and the cap plate 161 and the first electrode terminal 120 is fitted into the connection member 167. The connection member 167 makes close contact with the cap plate 161 and the gasket 165 through the terminal plate 166. The connection member 167 is electrically connected to the first electrode terminal 120 and the cap plate 161.

The upper insulation member 168 is positioned between the terminal plate 166 and the cap plate 161 and the second electrode terminal 130 is fitted into the upper insulation member 168. The upper insulation member 168 makes close contact with the cap plate 161 and the gasket 165 through the terminal plate 166. The upper insulation member 168 insulates the second electrode terminal 130 from the cap plate 161.

A method for fabricating the secondary battery 100 according to an embodiment of the present invention will now be briefly described with reference to FIGS. 6A and 6B. First, as shown in FIG. 6A, the first electrode uncoated portion 111a of the electrode assembly 110 is welded to the first terminal extension part 122 and the second electrode uncoated portion 112a of the electrode assembly 110 is welded to the second terminal extension part 132. Then, the first electrode terminal 120 and the second electrode terminal 130 are coupled to the terminal hole 121a of the insulation support member 140 and then coupled to the first terminal body 121 and the second terminal body 131 to pass through the cap plate 161. In one embodiment, the gasket 165 is inserted between each of the first and second electrode terminals 120 and 130 and the cap plate 161 and the first and second electrode terminals 120 and 130 are insulated from the cap plate 161 by the insulation part 141 of the insulation support member 140. Next, the support part 142 of the insulation support member 140 is coupled to the insulation part 141. In one embodiment, the coupling protrusion 142e of the support part 142 is engaged with the coupling hole 141c of the insulation part 141. Then, the terminal plate 166 is coupled to the first electrode terminal 120 and the second electrode terminal 130 protruding to the upper portion of the cap plate 161. In one embodiment, the coupling member 167 is coupled between the first electrode terminal 120 and the terminal plate 166 and the upper insulation member 168 is coupled between the second electrode terminal 130 and the terminal plate 166. Next, as shown in FIG. 6B, the electrode assembly 110 is bent approximately 90 degrees in view of welded portions of the first and second electrode uncoated portions 111a and 112a and the electrode assembly 110 is then placed in the case 150. In one embodiment, the elastic part 142c of the support part 142 supports the electrode assembly 110, thereby preventing the electrode assembly 110 from moving within the case 150. Then, an upper portion of the case 150 is sealed by the cap plate 161, thereby completing the secondary battery 100 according to an embodiment of the present invention.

As described above, in the secondary battery 100 according to an embodiment of the present invention, since the first and second electrode uncoated portions 111a and 112a are directly welded to the first and second electrode terminals 120 and 130, a current path is shortened and electrical resistance can be reduced. In addition, unlike in the conventional secondary battery, in the secondary battery 100 according to an embodiment of the present invention, a current collector connecting the electrode uncoated portion and the electrode terminal is not required, thereby reducing the cost.

In addition, the secondary battery 100 according to an embodiment of the present invention includes the insulation support member 140 including the insulation part 141 formed between the cap plate 161 and each of the first and second electrode terminals 120 and 130 and the support part 142 coupled to the insulation part 141, thereby insulating the first and second electrode terminals 120 and 130 from the cap plate 161. In addition, the support part 142 has the elastic part 142c formed convexly toward the electrode assembly 110, thereby supporting the electrode assembly 110 and preventing the electrode assembly 110 from moving.

Figure 7:
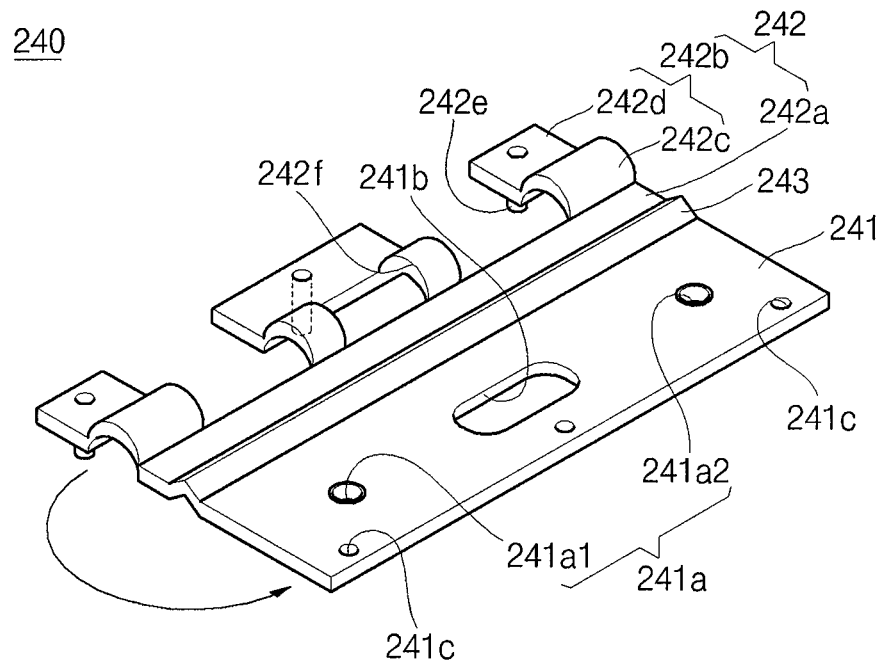
FIG. 7 is a perspective view of an insulation support member according to another embodiment of the present invention.

FIG. 7 is a perspective view of an insulation support member according to another embodiment of the present invention.

The insulation support member 240 shown in FIG. 7 is configured such that an additional leg part 142 is further formed at a center of a planar part 141 in the insulation support member 140 shown in FIG. 4. Thus, the following description will focus on differences between the insulation support members 140 and 240 respectively shown in FIGS. 4 and 7.

Referring to FIG. 7, the insulation support member 240 according to the embodiment of the present invention includes an insulation part 241, a support part 242 coupled to the insulation part 241 and a connection part 243 connecting the insulation part 241 and the support part 242.

The insulation part 241 is positioned between each of the first and second electrode terminals 120 and 130 and the cap plate 161 and insulates the first and second electrode terminals 120 and 130 from the cap plate 161. The insulation part 241 includes a terminal hole 241a, a throughhole 241b and a coupling hole 241c.

The terminal hole 241a includes a first terminal hole 241a1 coupled to the first electrode terminal 120 and a second terminal hole 241a2 coupled to the second electrode terminal 130.

The throughhole 241b is positioned between the first terminal hole 241a1 and the second terminal hole 241a2. The throughhole 241b is formed at a location corresponding to a safety vent 164 and an electrolyte injection hole 162 formed in the cap plate 161 to allow the safety vent 164 to properly operate and an electrolyte to be injected through the electrolyte injection hole 162.

The coupling hole 241c is positioned at the outermost part of the insulation part 241. In one embodiment, the coupling hole 241c is positioned far from a connection part 243 connecting the insulation part 241 and the support part 242. A coupling protrusion 242e of the support part 242 is engaged with the coupling hole 241c. The coupling hole 241c is formed to correspond to the coupling protrusion 242e in location and number.

The support part 242 includes a planar part 242a and leg parts 242b.

The planar part 242a extends from the insulation part 241 and is shaped of a planar plate. The planar part 242a is formed so as not to cover or block the throughhole 241b of the insulation part 241.

The leg parts 242b are formed at opposite edges and a center of the planar part 242a. In one embodiment, the leg parts 242b are formed so as not to cover or block the terminal hole 241a of the insulation part 241. Each of the leg parts 242b includes an elastic part 242c formed convexly toward the electrode assembly 110 and a coupling member 242d extending from the elastic part 242c and formed to be planar. A coupling protrusion 242e is formed in the coupling member 242d and the coupling protrusion 242e is engaged with the coupling hole 241c of the insulation part 241.

The elastic part 242c makes contact with the electrode assembly 110 and supports the electrode assembly 110 to prevent movement of the electrode assembly 110 within the case 150. In addition, since the insulation support member 240 further includes a leg part 242b centrally formed in the planar part 242a, the electrode assembly 110 can be supported in a more secured manner. In one embodiment, the elastic part 242c of the centrally formed leg part 242b is located corresponding to the throughhole 241b formed in the insulation part 241. Therefore, a hole 2421 is formed in the elastic part 242c, thereby preventing the elastic part 242c from closing or blocking the safety vent 164 and the electrolyte injection hole 162 formed in the cap plate 161.

Figure 8:
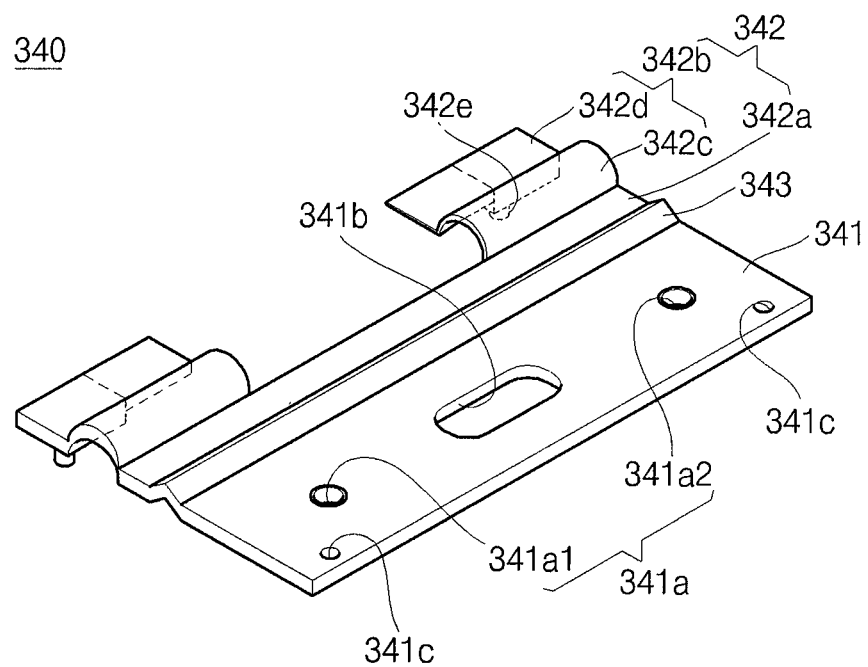
FIG. 8 is a perspective view of an insulation support member according to still another embodiment of the present invention.

FIG. 8 is a perspective view of an insulation support member according to still another embodiment of the present invention.

The insulation support member 340 shown in FIG. 8 is substantially the same with the insulation support member 140 shown in FIG. 4. Thus, the following description will focus on differences between the insulation support members 140 and 240 respectively shown in FIGS. 4 and 8.

Referring to FIG. 8, the insulation support member 340 according to still another embodiment of the present invention includes an insulation part 341, a support part 342 coupled to the insulation part and a connection part 343 connecting the insulation part 341 and the support part 342.

The insulation part 341 includes a terminal hole 341a, a throughhole 341b and a coupling hole 341c. The terminal hole 341a includes a first terminal hole 341a1 coupled to a first electrode terminal 120 and a second terminal hole 341a2 coupled to a second electrode terminal 130. Since the insulation part 341 is substantially the same with the insulation part 141 shown in FIG. 3, a repeated description will be omitted.

The support part 342 is coupled to a lower portion of the insulation part 341 and includes a planar part 342a and leg parts 342b.

The planar part 342a extends from the insulation part 341 and is shaped of a planar plate. The planar part 342a is formed so as not to cover or block the throughhole 341b of the insulation part 341.

The leg parts 342b are formed at opposite edges of the planar part 342a. In addition, each of the leg parts 342b extends to cover the terminal hole 341a, while not covering the throughhole 341b. Therefore, an empty space is formed between the leg parts 342b. In addition, each of the leg parts 342b includes an elastic part 342c formed convexly toward the electrode assembly 110 and a coupling member 342d extending from the elastic part 342c and formed to be planar.

The elastic part 342c makes contact with the electrode assembly 110 and supports the electrode assembly 110 to prevent movement of the electrode assembly 110.

The coupling member 342d is a part directly coupled to the insulation part 341. The coupling member 342d is formed to cover the first and second electrode terminals 120 and 130 coupled to the terminal hole 341a. In one embodiment, first and second electrode uncoated portions 111a and 112a are welded to bottom surfaces of the first and second electrode terminals 120 and 130. Therefore, the coupling member 342d is stepped such that thicknesses of portions of the coupling member 342d coming into contact with the first and second electrode terminals 120 and 130 are reduced. In addition, a coupling protrusion 342e is formed in the coupling member 342d to be coupled to the coupling hole 341c of the insulation part 341.

As described above, in the insulation support member 340 according to still another embodiment of the present invention, since the support part 342 is formed to cover the terminal hole 341a coupled to the first and second electrode terminals 120 and 130, thereby coupling the first and second electrode terminals 120 and 130 to the first and second electrode uncoated portions 111a and 112a in a more secured manner.

Figure 9:
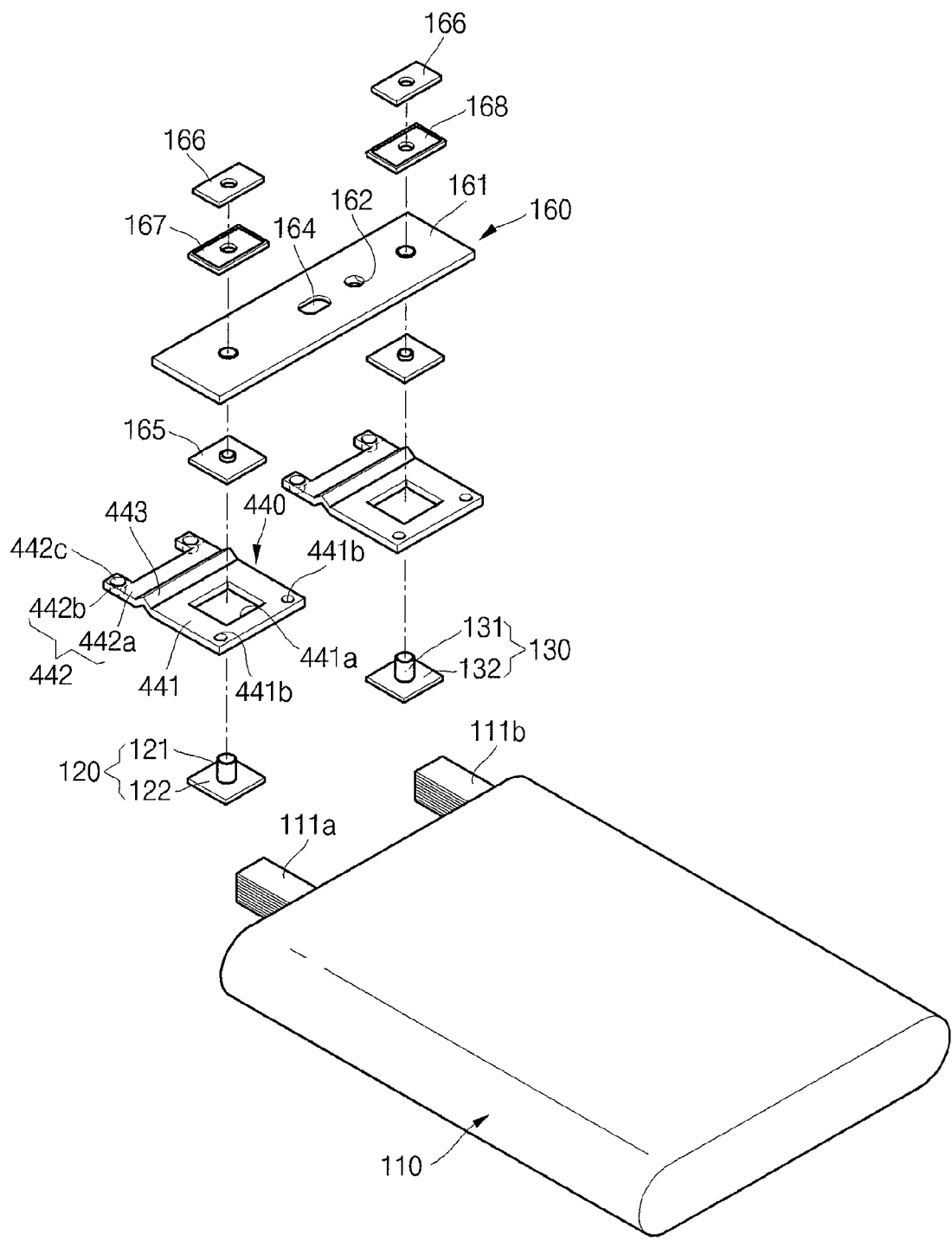
FIG. 9 is a partially exploded perspective view of a secondary battery according to another embodiment of the present invention.

FIG. 9 is an exploded perspective view of a secondary battery according to another embodiment of the present invention.

The secondary battery 400 shown in FIG. 9 is substantially the same with the secondary battery 100 shown in FIG. 6A, except for the shape of an insulation support member 440. Thus, the following description will focus on differences between the secondary batteries 100 and 400 respectively shown in FIGS. 6A and 9.

Referring to FIG. 9, the insulation support member 440 includes an insulation part 441, a support part 442 and a connection part 443. The insulation support member 440 is positioned between a cap plate 161 and an electrode assembly 110 and is coupled to a first electrode terminal 120 and a second electrode terminal 130, respectively.

The insulation part 441 is coupled to a lower portion of the cap plate 161 and is formed of an insulating material. The insulation part 441 is shaped of a rectangular plate and is sized to be larger than first and second terminal extension parts 122 and 132. The insulation part 441 includes a terminal hole 441a and a coupling hole 441b.

The first electrode terminal 120 or the second electrode terminal 130 are coupled to the terminal hole 441a. In detail, the first terminal extension part 122 or the second terminal extension part 132 is coupled to the terminal hole 441a. The coupling hole 441b is formed at the exterior side of the terminal hole 441a. A coupling protrusion 442c of the support part 442 is coupled to the coupling hole 441b. In other words, as the coupling protrusion 442c is coupled to the coupling hole 441b, the insulation part 441 and the support part 442 are coupled to each other.

The support part 442 is coupled to a lower portion of the insulation part 441. The support part 442 includes a planar part 442a and leg parts 442b. The planar part 442a is shaped of a planar plate. The planar part 442a is formed so as not to cover or block the terminal hole 441a of the insulation part 441. The leg parts 442b are formed at opposite edges of the planar part 442a. Therefore, an empty space is formed between the leg parts 442b. The leg parts 442b are formed so as not to cover or block the terminal hole 441a of the insulation part 441. A coupling protrusion 442c is formed in each of the leg parts 442b to be engaged with the coupling hole 441b of the insulation part 441.

The connection part 443 is positioned between the insulation part 441 and the support part 442. The connection part 443 is a part folded when the support part 442 is coupled to the insulation part 441. The connection part 443 may be hingedly formed to allow the support part 442 to be easily coupled to or separated to/from the insulation part 441.

Connection relationships between the insulation support member 440 and each of the first and second electrode terminals 120 and 130 will now be briefly described with reference to FIG. 9.

First, a gasket 165 and the first electrode terminal 120 and the second electrode terminal 130 are coupled to a lower portion of the cap plate 161. In one embodiment, the gasket 165 is formed inside a hole in the cap plate 161, into which the first and second electrode terminals 120 and 130 are inserted, and is formed to extend to a bottom surface of the cap plate 161. Therefore, the gasket 165 insulates the cap plate 161 and the first and second electrode terminals 120 and 130 from each other. Next, the insulation part 441 of the insulation support member 440 is coupled to a lower portion of the first electrode terminal 120. A first terminal extension part 122 of the first electrode terminal 120 is exposed to the outside through the terminal hole 441a formed in the insulation part 441. A first electrode uncoated portion 111a of the electrode assembly 110 is welded to the first terminal extension part 122. Then, the support part 442 of the insulation support member 440 is coupled to the insulation part 441. In addition, since the insulation support member 440 is also coupled to the second electrode terminal 130 in the same manner with the first electrode terminal 120, a repeated description will be omitted. Next, a terminal plate 166 is coupled to the first electrode terminal 120 and the second electrode terminal 130 protruding to an upper portion of the cap plate 161 and upper portions of the first electrode terminal 120 and the second electrode terminal 130 are riveted. In one embodiment, a coupling member 167 is coupled between the first electrode terminal 120 and the terminal plate 166 and an upper insulation member 168 is coupled between the second electrode terminal 130 and the terminal plate 166.

The insulation support member 440 improves coupling forces between the first electrode terminal 120 and the first electrode uncoated portion 111a and between the second electrode terminal 130 and the second electrode uncoated portion 112a. In addition, the insulation support member 440 may prevent an electric short between the cap plate 161 and the electrode assembly 110.

Although the secondary battery of the present invention has been described with reference to certain exemplary embodiments thereof, it will be understood by those skilled in the art that a variety of modifications and variations may be made to the present invention without departing from the spirit or scope of the present invention defined in the appended claims, and their equivalents.

What is claimed is:

1. A secondary battery comprising:
    an electrode assembly;
    a case accommodating the electrode assembly;
    a cap plate sealing the case;
    a first electrode terminal electrically connected to the electrode assembly and passing through the cap plate, wherein the electrode assembly is connected to the first electrode terminal through a first current collection tab;
    a second electrode terminal electrically connected to the second electrode plate, wherein the electrode assembly is connected to the second electrode terminal through a second current collection tab;
    an insulation support member comprising:
    an insulation part coupled to the first electrode terminal and the second electrode terminal, positioned under the cap plate, and insulating the first and second electrode terminals from the cap plate;
    a support part coupled to a lower portion of the insulation part and supporting the electrode assembly; and
    a connection part connecting the insulation part and the support part to each other.

2. The secondary battery of claim 1, wherein the electrode assembly comprises a first electrode plate having a first electrode uncoated portion being the first current collection tab, a second electrode plate having a second electrode uncoated portion, and a separator located between the first electrode plate and the second electrode plate.

3. The secondary battery of claim 1, wherein the electrode assembly comprises a first electrode plate having a first electrode uncoated portion, a second electrode plate having a second electrode uncoated portion, and a separator located between the first electrode plate and the second electrode plate, and wherein the first current collection tab is coupled to the first electrode uncoated portion.

4. The secondary battery of claim 1, wherein the first current collection tab protrudes from the electrode assembly, wherein a first portion of the first current collection tab is connected to the first electrode terminal and a second portion of the first current collection tab is bent from the first portion.

5. The secondary battery of claim 1, wherein a plurality of electrode assemblies are connected to the first electrode terminal.

6. The secondary battery of claim 5, wherein the first current collection tab of adjacent ones of the plurality of electrode assemblies are symmetrically oriented to face each other.

7. The secondary battery of claim 6, wherein a guide plate is coupled to the first current collection tab.

8. The secondary battery of claim 1, wherein the insulation support member located between each of the first and second electrode terminals and the cap plate and couples the first and second electrode terminals to the cap plate.

9. The secondary battery of claim 1, wherein the insulation part comprises:
    a terminal hole comprising a first terminal hole coupled to the first electrode terminal and a second terminal hole coupled to the second electrode terminal;
    a throughhole positioned between the first terminal hole and the second terminal hole; and
    a coupling hole positioned at an exterior side of the terminal hole.

10. The secondary battery of claim 9, wherein the throughhole is formed at a location corresponding to a safety vent and an electrolyte injection hole formed in the cap plate.

11. The secondary battery of claim 9, wherein the support part includes a planar part extending from the insulation part and legs extending from opposite edges of the planar part.

12. The secondary battery of claim 11, wherein each of the legs comprises an elastic part extending from the planar part and formed convexly toward the electrode assembly; and a coupling member extending from the elastic part and formed to be planar.

13. The secondary battery of claim 12, wherein the coupling member has a coupling protrusion formed therein and wherein the coupling protrusion is coupled to the coupling hole.

14. The secondary battery of claim 12, wherein the planar part does not block the throughhole and the legs do not block the terminal hole.

15. The secondary battery of claim 12, further comprising a center leg at a center of the planar part between the legs and wherein a hole corresponding to the throughhole is formed in the elastic part of the center leg.

16. The secondary battery of claim 12, wherein each leg extends to cover the terminal hole and wherein a coupling member of the leg is stepped.

17. The secondary battery of claim 1, wherein the first electrode terminal includes a first terminal body passing through the cap plate and a first terminal extension part horizontally extending from a lower portion of the first terminal body wherein the second electrode terminal includes a second terminal body passing through the cap plate and a second terminal extension part horizontally extending from a lower portion of the second terminal body wherein the first current collection tab is welded to the first terminal extension part, and wherein the second current collection tab is welded to the second terminal extension part.

* * * * *